United States Patent
Umezawa et al.

(10) Patent No.: US 8,835,001 B2
(45) Date of Patent: Sep. 16, 2014

(54) FERRITE SINTERED MAGNET, MOTOR, AND METHOD FOR PRODUCING THE FERRITE SINTERED MAGNET

(75) Inventors: Hideyuki Umezawa, Tokyo (JP); Yoshihiko Minachi, Tokyo (JP); Osanori Mizonoue, Tokyo (JP)

(73) Assignee: TDK Corporation, Tokyo (JP)

( * ) Notice: Subject to any disclaimer, the term of this patent is extended or adjusted under 35 U.S.C. 154(b) by 81 days.

(21) Appl. No.: 13/431,450

(22) Filed: Mar. 27, 2012

(65) Prior Publication Data

US 2012/0248913 A1  Oct. 4, 2012

(30) Foreign Application Priority Data

Mar. 31, 2011 (JP) ................ 2011-080726

(51) Int. Cl.
*B32B 5/16* (2006.01)

(52) U.S. Cl.
USPC ........... 428/402; 428/407; 428/838; 148/303; 252/62.63

(58) Field of Classification Search
USPC ......... 428/838, 402, 407; 148/303; 252/62.63
See application file for complete search history.

(56) References Cited

U.S. PATENT DOCUMENTS

| | | | |
|---|---|---|---|
| 6,258,290 B1 * | 7/2001 | Taguchi et al. | 252/62.59 |
| 6,995,643 B2 * | 2/2006 | Fujiwara et al. | 336/110 |
| 7,166,377 B2 * | 1/2007 | Murao | 428/840.2 |
| 7,425,280 B2 * | 9/2008 | Nagaoka et al. | 252/62.63 |
| 7,740,716 B2 * | 6/2010 | Enokido et al. | 148/303 |
| 7,879,469 B2 * | 2/2011 | Minachi et al. | 428/836.2 |
| 7,919,007 B2 * | 4/2011 | Minachi et al. | 252/62.63 |
| 8,033,314 B2 * | 10/2011 | Gotoh et al. | 164/113 |

FOREIGN PATENT DOCUMENTS

| | | |
|---|---|---|
| JP | A-10-125519 | 5/1998 |
| JP | A-2007-270235 | 10/2007 |

* cited by examiner

*Primary Examiner* — Leszek Kiliman
(74) *Attorney, Agent, or Firm* — Oliff PLC

(57) ABSTRACT

A ferrite sintered magnet has a surface roughness Rz of 3.5 μm or less. A method for producing a ferrite sintered magnet includes: mixing magnetic powders with at least a binder resin to obtain a magnetic powder mixture; injection molding the magnetic powder mixture inside of a mold having a surface roughness of a surface in contact with the magnetic powder mixture of 2.0 μm or less with a magnetic field applied to the mold, to obtain a molded body; and sintering the molded body.

5 Claims, 4 Drawing Sheets

FERRITE SINTERED MAGNET, MOTOR, AND METHOD FOR PRODUCING THE FERRITE SINTERED MAGNET

CROSS-REFERENCE TO RELATED APPLICATIONS

This application is based upon and claims the benefit of priority from Japanese Patent Application No. 2011-080726, filed on Mar. 31, 2011, the entire contents of which are incorporated herein by reference.

BACKGROUND OF THE INVENTION

1. Field of the Invention

The present invention relates to a decrease in dust emission of a ferrite sintered magnet and a method for producing the ferrite sintered magnet. The invention also relates to a decrease in dirt of a motor.

2. Description of the Related Art

Ferrite sintered magnets are widely used for motors and the like mounted in household electric appliances, automobiles, and the like. Japanese Patent Application Laid-Open No 10-125519 describes a technique in which a glass glaze is applied to the surface of a ferrite sintered magnet and baked.

Ferrite sintered magnets produced in a general process come in contact with each other to cause friction during transport. As a result, magnet dust is generated and the surface of the ferrite sintered magnets may be tarnished. In order to suppress the generation of the dust and the tarnish of the ferrite sintered magnet, a work of individually packing the ferrite magnets, and the like are required before the transport, and thus a packing cost is increased. Further, when the ferrite sintered magnets are assembled into various machines, the ferrite sintered magnets come in contact with a fastening tool and the surface of the ferrite sintered magnets is rubbed with the tool. As a result, dust is generated. For example, when the ferrite sintered magnets are inserted into and attached to a case of a motor, the ferrite sintered magnets are rubbed against the case to generate dust. The motor gets dirty by the dust. The technique in Patent Literature 1 aims to prevent dirt caused by generated magnetic powder. However, when after a general process of producing a ferrite sintered magnet, a glaze application process and a baking process are performed as the technique in Patent Literature 1, the number of processes is increased, and a material cost is also increased. Therefore, a production cost is increased.

SUMMARY OF THE INVENTION

According to a first aspect of the present invention, there is provided a ferrite sintered magnet having a surface roughness Rz of 3.5 μm or less.

According to a second aspect of the present invention, there is provided a method for producing a ferrite sintered magnet including: mixing magnetic powders with at least a binder resin to obtain a magnetic powder mixture; injection molding the magnetic powder mixture inside of a mold having a surface roughness of a surface in contact with the magnetic powder mixture of 2.0 μm or less with a magnetic field applied to the mold, to obtain a molded body; and sintering the molded body.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of the present invention will be described in detail with reference to the drawings. Note that embodiments of the present invention is not limited to the following description. The components in the following description include those which can be readily envisaged by one skilled in the art, be substantially the same, and falls within the range of equivalent. Constitutions disclosed below can be appropriately combined with each other.

It is an object of one embodiment of the present invention is to easily decrease dust emission and tarnish of a ferrite sintered magnet and to decrease dirt of an apparatus when the ferrite sintered magnet is assembled into the apparatus. Another object of another embodiment of the present invention is to obtain a motor of which dirt is decreased.

In the present embodiment, a surface roughness Rz is a 10 point average roughness. The 10 point average roughness is the sum of the average of the absolute values of the 5 highest peak points (Yp) and the average of the absolute values of the 5 lowest valley points (Yv) which are measured in a longitudinal magnification direction from an average line of only a standard length which is taken from a roughness curve in the direction of the average line, and represents this value in micrometers.

Figure 1:
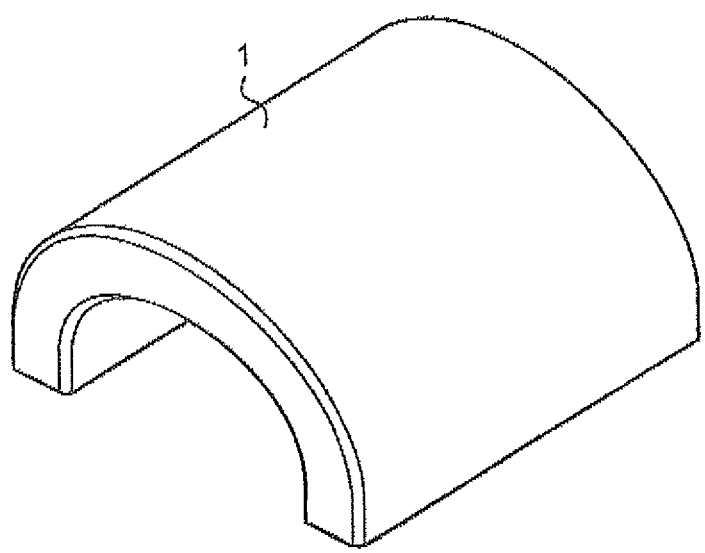
FIG. 1 is a perspective view of a ferrite sintered magnet according to an embodiment of the present invention.

FIG. 1 is a perspective view of a ferrite sintered magnet according to the present embodiment. A ferrite sintered magnet 1 is a permanent magnet, for example, used in a stator of a motor. An object to which the ferrite sintered magnet according to the present embodiment is applied is not limited to a motor, and the ferrite sintered magnet is widely applicable to a permanent magnet used in a generator, a speaker, a microphone, a magnetron tube, a magnetic field generating apparatus for MRI, an ABS sensor, a fuel/oil level sensor, a sensor for distributors, a magnet clutch, and the like. The shape of the ferrite sintered magnet 1 is not limited to a shape having a C-shaped cross-section as shown in FIG. 1.

The ferrite sintered magnet according to the present embodiment has relatively high magnetic characteristics and is inexpensive, and therefore is widely used. The kind of ferrite sintered magnet is not particularly limited, and barium, strontium, and calcium ferrite sintered magnets, and the like can be used.

Next, the method for producing a ferrite sintered magnet according to the present embodiment will be described. In the present embodiment, the production of a ferrite sintered magnet having a surface roughness Rz of 3.5 μm or less is required. The production method is not limited to the following method as long as such a ferrite sintered magnet can be produced.

Figure 2:
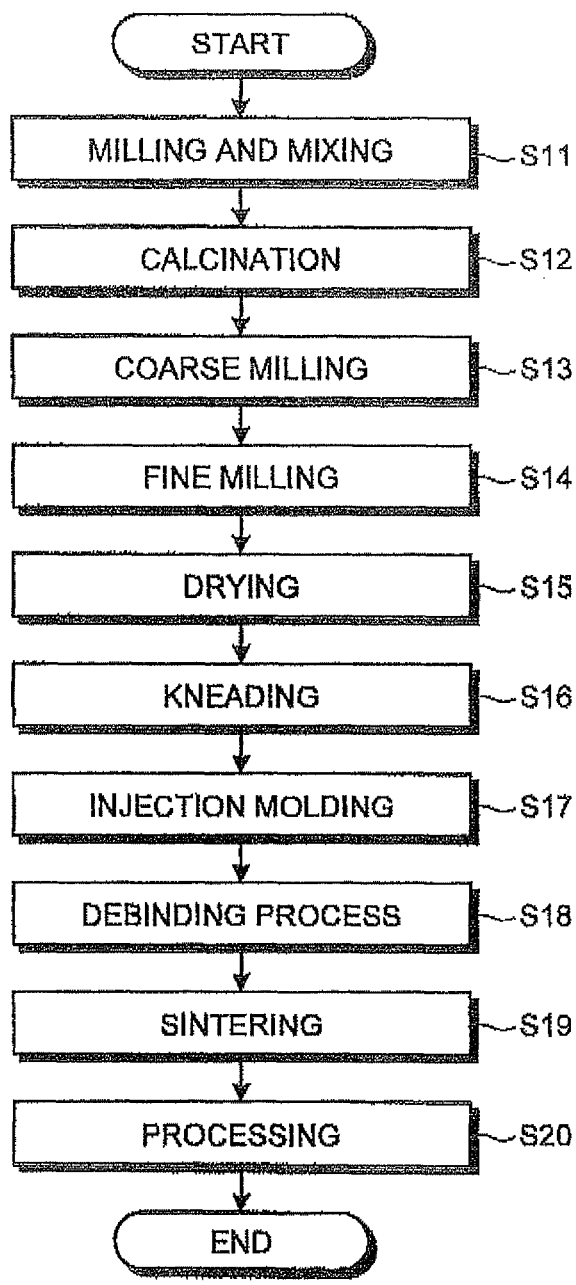
FIG. 2 is a flowchart showing a procedure of the method for producing a ferrite sintered magnet according to the present embodiment.

FIG. 2 is a flowchart showing a procedure of the method for producing a ferrite sintered magnet according to the present embodiment. Powders of starting materials (raw material powders) are prepared, weighed, and for example, mixed and milled with a wet attrition mill (step S11). The raw material powders are not particularly limited. The mixed and milled raw material powders are dried, sized, and calcined (step S12). In the calcination, the raw material powders are calcined, for example, in air at 1000° C. to 1350° C. for 1 hour to about 10 hours. The raw material powders are calcined to obtain a granular calcined body.

The calcined body obtained is coarsely milled (step S13) to obtain a calcined powder. In the present embodiment, the calcined body is subjected to dry coarse milling, for example, with a vibration mill, but means for milling the calcined body is not limited thereto. For example, a dry attrition mill (media agitating mill), a dry ball mill, and the like can be used as the means. A coarse milling time can be appropriately determined depending on the milling means. The dry coarse milling also has an effect in which crystalline distortion is introduced into particles of the calcined body to reduce a coercive force HcJ. The reduction of the coercive force HcJ suppresses agglomeration of the particles to improve dispersibility. In addition, the degree of orientation is also improved. The crystalline distortion introduced into the particles is relaxed in a sintering described below, so that original hard magnetism is restored to make a permanent magnet.

After completion of the coarse milling, the resulting calcined powder is finely milled (step S14). When fine milling is performed in the present embodiment, the calcined powder, a dispersant, and water are mixed to prepare a slurry for milling. The slurry for milling is subjected to wet milling with a ball mill. Leans for fine milling is not limited to a ball mill, and for example, an attrition mill, a vibration mill, and the like can be used. A fine milling time can be appropriately determined depending on the milling means. A surfactant (for example, polyhydric alcohol represented by a formula $C_n(OH)_nH_{n+2}$) may be added to the slurry for milling. The number n of carbon atoms in the polyhydric alcohol is 4 or more, preferably 4 to 100, more preferably 4 to 30, yet more preferably 4 to 20, and most preferably 4 to 12.

The slurry for milling after finely milled is dried (step S15) to obtain a magnetic powder. A drying temperature in step S15 is preferably 80° C. to 150° C., and more preferably 100° C. to 120° C. A drying time in step S15 is preferably 60 minutes to 600 minutes, and more preferably 300 minutes to 600 minutes. The obtained magnetic powder is mixed in a binder resin, a wax, a lubricant, and a plasticizer, and the resulting mixture is mixed and kneaded with a kneader under a heating environment (in the present embodiment, at about 150° C.) for a predetermined time (about 2 hours) (step S16) to obtain a kneaded mixture. The magnetic powder needs to be mixed and kneaded with at least a binder resin.

A macromolecular compound such as a thermoplastic resin is used as the binder resin, and examples of the thermoplastic resins used may include polyethylene, polypropylene, an ethylene vinyl acetate copolymer, atactic polypropylene, an acrylic polymer, polystyrene, polyacetal, and the like. Examples of the wax used include, in addition to natural wax such as carnauba wax, montan wax, and bees wax, synthetic wax such as paraffin wax, urethane wax, and polyethylene glycol. Examples of the lubricant used include a fatty acid ester or the like, and a phthalate ester is used as the lubricant.

The kneaded mixture obtained by the above-described procedure is molded with a pelletizer (for example, a twin taper single extruder). Thus, a magnetic powder mixture (hereinafter referred to as pellet) in which the magnetic powder is dispersed in the binder resin is obtained. The obtained pellets are injection molded (step S17) to obtain a magnetic powder molded body. Next, the injection molding apparatus used in injection molding will be described.

Figure 3:
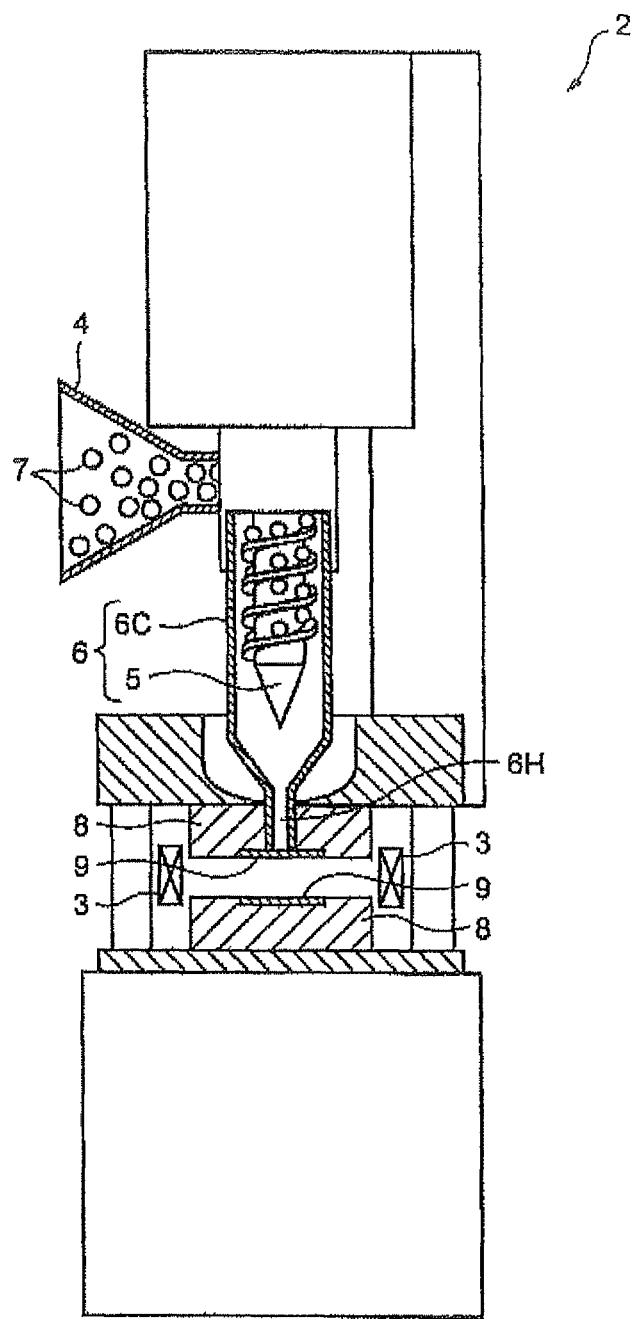
FIG. 3 is a cross-sectional view of an injection molding apparatus used in the method for producing a ferrite sintered magnet according to the present embodiment.

FIG. 3 is a cross-sectional view of an injection molding apparatus used in the method far producing a ferrite sintered magnet according to the present embodiment. An injection molding apparatus 2 is an injection molding apparatus using CIM (Ceramic Injection Molding), and is used to perform injection molding in a magnetic field formed by a magnetic field application apparatus 3. The injection molding apparatus 2 includes the magnetic field application apparatus 3, an input port 4, a screw 5, an extruder 6, and a mold 8. A magnetic powder pellet 7 is input into the input port 4. The extruder 6 has a cylindrical casing 6C, and the screw 5 rotatably mounted inside the casing 6C. The input port 4 and the casing 6C are jointed through a path through which the pellets 7 pass. By further inputting the pellets 7 into the input port 4, the existing pellets 7 are further introduced into the inside of the casing 6C. While the pellets 7 introduced into the inside of the casing 6C is heated and molten in the extruder 6, the pellets are transported to an injection port 6H with the use of the screw 5.

The injection port 6H is in communication with a cavity 9 of the mold 6. In the extruder 6, the molten pellets 7 (molten body) are injected into the cavity 9 of the mold 8 through the injection port 6H. The cavity 9 of the mold 8 has a shape to which the outer shape of the ferrite sintered magnet is transferred. The magnetic field application apparatus 3 is disposed around the mold 8, and thus injection molding can be performed with a magnetic field applied to the mold 8. In the injection molding, the mold 8 is closed prior to injection into the mold, and the magnetic field is applied to the mold 8 by the magnetic field application apparatus 3. In the injection molding, the pellets 7 are heated, for example, at about 160° C. to 230° C. and molten inside of the extruder 6, and are injected into the cavity 9 of the mold 8 by the screw 5. The temperature of the mold 8 is, for example, about 20° C. to 80° C. The magnetic field applied to the mold 8 is, for example, about 400 kA/m to 1200 kA/m.

The surface of the cavity 9 is a surface (pellet contact surface) in contact with the molten pellets 7 (magnetic powder mixture). When a ferrite sintered magnet is produced by injection molding, the shape of surface of the cavity 9 is transferred to the surface of the molded body. Therefore, the surface roughness Rz of pellet contact surface of the cavity 9 needs to become the same degree as the surface roughness of the ferrite sintered magnet to be produced. In the present embodiment, the surface of the ferrite sintered magnet needs to be 3.5 or less, and preferably less than 2.0 µm. The ferrite sintered magnet is obtained by sintering the molded body obtained by the injection molding in step S17. The volume of the sintered body is smaller than that of the molded body because of sintering. In consideration of a decrease in volume due to sintering, it is preferable that the pellet contact surface of the cavity 9 have a surface roughness Rz (10 point average roughness) of 2.0 µm or less. Thus, the molded body obtained by injection molding is only sintered without grinding, and a ferrite sintered magnet having a surface roughness Rz of 3.5 µm or less can thereby be obtained. Therefore, the productivity of the ferrite sintered magnet is improved. Further, the surface roughness Rz of pellet contact surface of the cavity 9 can appropriately be changed depending on the surface roughness Rz of the ferrite sintered magnet to be produced.

In the present embodiment, since a magnetic powder molded body is obtained by injection molding, there is an advantage of high degree of freedom of shape of the molded body. For this reason, in the method for producing a ferrite sintered magnet according to the present embodiment, a ferrite sintered magnet having a complex three-dimensional shape can be produced.

After the molded body is obtained by injection molding in step S17, the molded body is subjected to a debinding process (step S18). For example, the debinding process is a process of maintaining the obtained molded body in air at a predetermined temperature (for example, about 300° C. to 600° C.) for a predetermined time (for example, about 1 hour to 60 hours). For example, the molded body after the debinding process is sintered in air (step S19) to obtain a sintered body. The sintering temperature of the molded body is, for example, 1100° C. to 1250° C., and preferably 1160° C. to 1220° C. The sintering time is, for example, about 0.2 hours to 3 hours.

If needed, the obtained sintered body is subjected to deburring, processing, or grinding to complete a ferrite sintered magnet (step S20). The ferrite sintered magnet is then magnetized. In the present embodiment, since a molded body before sintering is produced by injection molding, in principle, the molded body is only sintered to complete a ferrite sintered magnet. Thus, since the grinding or processing of the sintered body can be omitted, the productivity is improved. Further, when the molded body before sintering is produced by injection molding, a complex processing is unnecessary even in a case of production of the ferrite sintered magnet having a complex three-dimensional shape. Accordingly, the productivity is extremely high.

The molded body is produced using CIM in the above description, but a procedure of producing a molded body by the method for producing a ferrite sintered magnet according to the present embodiment is not limited. For example, a ferrite sintered magnet may be produced as follows. In the fine milling in step S14, a slurry for milling is subjected to wet milling, and the obtained slurry for milling is molded to produce a molded body. The obtained molded body is sintered to obtain a sintered body, and the surface of the sintered body is ground to produce a ferrite sintered magnet having a surface roughness of 3.5 μm or less.

When the ferrite sintered magnet is produced, Si and the like are sometimes added as an auxiliary agent in the middle of the process. However, after sintering, most of these elements gather at a crystal grain boundary of the ferrite sintered magnet, and do not appear on the surface. Further, the ferrite sintered magnet is not generally subjected to a heat treatment after the sintering. Therefore, in the ferrite sintered magnet, the surface roughness Rz cannot be decreased by the formation of a heterogeneous phase containing Si and the like in a glass state on the surface of the ferrite sintered magnet. Accordingly, the surface roughness Rz of the ferrite sintered magnet itself needs to be decreased.

In injection molding, the surface roughness Rz of the pellet contact surface of a cavity of a mold can be adjusted, so that a molded body having a small surface roughness Rz can be easily mass-produced. Therefore, in the injection molding, the produced molded body is only sintered without grinding of the surface of the obtained ferrite sintered magnet, so that the ferrite sintered magnet having a small surface roughness Rz can be easily mass-produced.

[Evaluation]

Ferrite sintered magnets having a different surface roughness were produced, and dust emission caused by friction and the degree of tarnish were evaluated. The ferrite sintered magnets were produced by injection molding. Comparative examples described below do not mean conventional examples. The method for producing a ferrite sintered magnet will be described. A $Fe_2O_3$ powder, a $SrCO_3$ powder, a $La(OH)_3$ powder, a $CaCO_3$ powder, and a $Co_3O_4$ powder were prepared as a starting material. The predetermined amounts of these materials were taken, and these materials and an additive were milled with a wet attrition mill, dried, and sized. After then, calcination in air at 1230° C. for 3 hours was performed to obtain a granular calcined body.

The obtained calcined body was subjected to dry coarse milling with a vibration mill to obtain a calcined powder. Subsequently, sorbitol was used as a dispersant, 0.5 parts by mass of sorbitol, 0.5 parts by mass of $SiO_2$, and 1.4 parts by mass of $CaCO_3$ were added to 100 parts by mass of calcined powder, and the mixture was mixed with water to produce a slurry for milling. The slurry for milling was subjected to wet milling with a ball mill. The wet milling time was 40 hours. After the wet milling, the slurry for milling was dried at 100° C. for 10 hours to obtain a magnetic powder. The average particle diameter of the obtained magnetic powder was 0.3 μm.

The obtained magnetic powder, a binder resin (polyacetal), a wax (paraffin wag), a lubricant (fatty acid ester), and a plasticizer (phthalate ester) were mixed and kneaded with a kneader at 150° C. for 2 hours to obtain a kneaded mixture. At this time, 7.5 parts by mass of the binder resin, 7.5 parts by mass of the wax, and 0.5 parts by mass of the lubricant were mixed with 100 parts by mass of magnetic powder. Further, 1 part by mass of the plasticizer was mixed with 100 parts by mass of the binder resin. The obtained kneaded mixture was molded with a pelletizer to produce pellets (magnetic powder mixture) in which the magnetic powder was dispersed in the binder resin.

Then, the obtained pellets were injection molded to produce a molded body.

The molded body had a circular (C-shaped) cross-section. The mold having a cavity with such a shape was used. The obtained pellets were input through an input port of an injection molding apparatus, and then introduced into an extruder heated at 160° C. The pellets were heated and molten inside the extruder of the injection molding apparatus and injected by a screw into the cavity of the mold with a magnetic field applied. Thus, a C-shaped molded body was obtained.

The molded body was subjected to a debinding process of maintaining the molded body in air at 500° C. for 48 hours. The molded body subjected to the debinding process was sintered in air at 1200° C. for 1 hour. As a result, a ferrite sintered magnet having a composition of $La_{0.4}Ca_{0.4}Sr_{0.2}Co_{0.3}Fe_{11.3}O_{19}$ was obtained. The obtained ferrite sintered magnet was ground with a grindstone of different grain size to obtain a sample of a ferrite sintered magnet having a different surface roughness. When the ferrite sintered magnet was ground with a grindstone of grain size #80/100, a sample having a surface roughness Rz of 5.70 μm to 6.50 μm was obtained. When the ferrite sintered magnet was ground with a grindstone of grain size #100/120, a sample having a surface roughness Rz of 4.50 μm to 5.70 μm was obtained. When the ferrite sintered magnet was ground with a grindstone of grain size #140/170, a sample having a surface roughness Rz of 2.50 μm to 3.50 μm is obtained. Further, when injection molding was performed using a mold in which the surface roughness Rz of the pellet contact surface of a cavity had been adjusted, a ferrite sintered magnet sample having a different surface roughness could be obtained. A sample having a surface roughness Rz of less than 2.00 μm could be obtained by injection molding using a mold having the adjusted surface roughness Rz. The surface roughness of the obtained sample was measured as follows.

The surface roughness Rz was measured using a stylus type surface roughness tester for measuring the height of roughness. At this time, the reference length was 0.7 mm, the cutoff value was 0.8 mm, and the scanning rate of a stylus was 0.3 mm/sec.

[Method of Evaluating Degree of Dust Emission Property]

The degree of dust emission property was evaluated as follows. Two pieces of a sample ground using a grindstone with the same grain size under the same condition, or two pieces of an unground sample were rubbed against each other 100 times. A transparent tape was then applied to the surface of the sample and peeled off. Next, the transparent tape was applied to a white paper. The amount of dust attached to the tape was classified into three steps by visual observation. The evaluation of a sample in which a large amount of dust is attached to the tape is represented by a cross (no effect of decreasing dust emission), the evaluation of a sample in which a slight amount of dust is attached to the tape is represented by a circle (effect of decreasing dust emission), and the evaluation of a sample in which dust is hardly attached to the tape is represented by a double circle (effect of remarkably decreasing dust emission).

The degree of dust emission property is supplemented. With respect to the cross, the degree is a degree in which everyone can confirm that a large amount of fine powder is obviously attached to a magnet surface, and a large amount of fine powder is attached to a hand when the magnet surface is touched by the hand. With respect to the circle, the degree is a degree in which attachment of a slight amount of fine powder to the magnet surface can be confirmed by careful observation, and a slight amount of fine powder is attached to a hand when the magnet surface is touched by the hand. With respect to the double circle, the degree is a degree in which the fine powder is not attached to the magnet surface, and the fine powder is not attached to a hand when the magnet surface is touched by the hand.

[Method of Evaluating Degree of Tarnish]

The degree of tarnish was evaluated by determining the concentration of brown color of the tape obtained in the evaluation of degree of dust emission property by visual observation. The evaluation of a sample in which a brown tape is obtained is represented by a cross (no effect of decreasing tarnish), the evaluation of a sample in which a light brown tape is obtained is represented by a circle (effect of decreasing tarnish), and the evaluation of a sample in which tarnish is hardly confirmed is represented by a double circle (effect of remarkably decreasing tarnish).

[Method of Evaluating Degree of Dirt]

Figure 4:
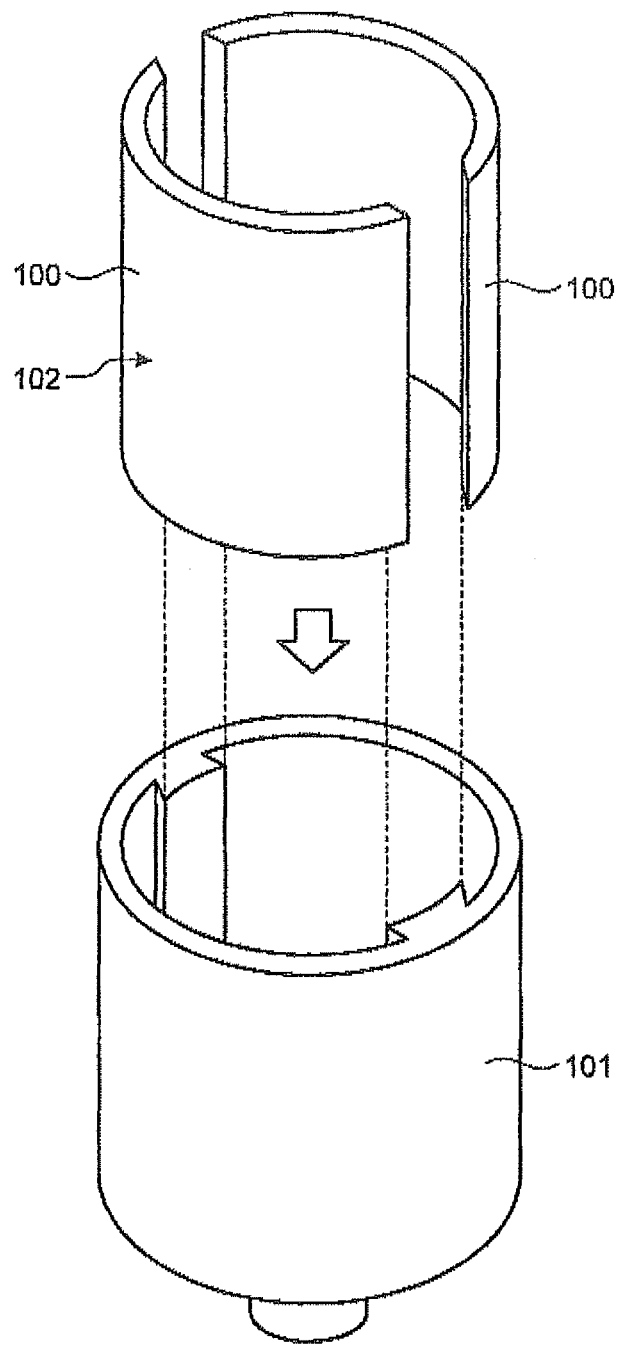
FIG. 4 is a view illustrating a method for evaluating effects of decreasing dirt of a ferrite sintered magnet.

The degree of dirt when the sample was assembled into the apparatus was evaluated as follows. FIG. 4 is a view illustrating a method for evaluating an effect of decreasing dirt of a ferrite sintered magnet. The effect of decreasing dirt was evaluated by classifying the presence of dust in the inner face of a motor case 101 and dirt caused after insertion of a sample 100 into the motor case 101 of a direct current brush motor into three steps by visual observation. The sample 100 was inserted from an opening of the motor case 101 so that a circumference surface 102 of the sample 100 comes in contact with the inside of the motor case 101, 100 samples ground using a grindstone with the same grain size under the same condition or 100 unground samples were rubbed against one another 100 times, and each inserted into a motor case having the same size. The, the evaluation was performed. The evaluation of a sample in which dust is attached to the inside of the motor case and occurrence of dirt was observed is represented by a cross (no effect of decreasing dirt), the evaluation of a sample in which a slight amount of dust is attached to the inside of the motor case and occurrence of dirt is slight is represented by a circle (effect of decreasing dirt), and the evaluation of a sample in which dust is not attached to the inside of the motor case and dirt hardly occurs is represented by a double circle (effect of remarkably decreasing dirt). Table 1 shows evaluation results of the degree of dust emission property, the degree of tarnish, and the degree of dirt.

TABLE 1

| SURFACE ROUGHNESS OF SAMPLE | STATE OF MAGNET AFTER 100-TIME RUBBING | | EVALUATION IN ASSEMBLY INTO MOTOR DIRT |
|---|---|---|---|
| | DUST EMISSION | DEGREE OF TARNISH | |
| 5.7 µm < Rz (GROUND PRODUCT USING GRINDSTONE OF GENERAL GRAIN) | X | X | X |
| 3.5 < Rz ≤ 5.7 µm (GROUND PRODUCT USING GRINDSTONE OF FINE GRAIN) | X | X | X |
| 2.0 ≤ Rz ≤ 3.5 µm (GROUND PRODUCT USING GRINDSTONE OF ULTRAFINE GRAIN) | ○ | ○ | ○ |
| Rz < 2.0 µm (UNGROUND PRODUCT) | ◎ | ◎ | ◎ |
| EVALUATION CRITERION | X: DUST EMISSION ○: LITTLE DUST EMISSION ◎: NO DUST EMISSION | X: BROWN ○: LIGHT BROWN ◎: NO TARNISH | X: DIRT ○: LITTLE DIRT ◎: NO DIRT |

As shown in the evaluation results of Table 1, a ferrite sintered magnet having a surface roughness Rz of 3.5 µm or less decreases dust emission property and tarnish, and decreases dirt when it is assembled into the apparatus. Further, it is found that a ferrite sintered magnet having a surface roughness Rz of less than 2.0 µm remarkably decreases dust emission property and tarnish, and decreases dirt when it is assembled into the apparatus. Moreover, it is found that dirt is decreased in a motor containing a ferrite sintered magnet having a surface roughness Rz of 3.5 µm or less or a ferrite sintered magnet having a surface roughness Rz of less than 2.0 µm.

According to one embodiment of the present invention, there is provided a method for producing the ferrite sintered magnet according to the present invention is characterized by including the steps of: mixing magnetic powders with at least a binder resin to obtain a magnetic powder mixture; injection molding the magnetic powder mixture inside of a mold having a surface roughness of a surface in contact with the magnetic powder mixture of 2.0 µm or less with a magnetic field applied to the mold, to obtain a molded body; and sintering the molded body.

In the method for producing a ferrite sintered magnet, a mold in which the surface roughness in a part in contact with a magnetic powder mixture is 2.0 µm or less is used and the magnetic powder mixture is injection molded inside of the mold to obtain a molded body. The obtained molded body is then sintered to produce a sintered magnet. The molded body obtained using such a mold is sintered to easily produce a ferrite sintered magnet having a surface roughness of 3.5 µm or less.

According to the embodiments of the present invention, dust emission and tarnish of a ferrite sintered magnet can be easily decreased and dirt of an apparatus can be decreased when the ferrite sintered magnet is assembled into the apparatus. Further, dirt of the motor according to the embodiment of the present invention can be decreased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ferrite sintered magnet comprising an unground surface; wherein a surface roughness Rz of the unground surface is 3.5 μm or less.

2. The ferrite sintered magnet according to claim 1, wherein the surface roughness Rz is less than 2.0 μm.

3. A motor using the ferrite sintered magnet according to claim 1.

4. A motor using the ferrite sintered magnet according to claim 2.

5. A method for producing a ferrite sintered magnet comprising:
   mixing magnetic powders with at least a binder resin to obtain a magnetic powder mixture;
   injection molding the magnetic powder mixture inside of a mold having a surface roughness Rz of a surface in contact with the magnetic powder mixture of 2.0 μm or less with a magnetic field applied to the mold, to obtain a molded body; and
   sintering the molded body.

* * * * *